(12) United States Patent
Otsuki et al.

(10) Patent No.: US 9,709,133 B2
(45) Date of Patent: Jul. 18, 2017

(54) SPEED CHANGE DEVICE

(71) Applicant: AISIN AW CO., LTD., Anjo-shi, Aichi-ken (JP)

(72) Inventors: Kazuhiko Otsuki, Toyoake (JP); Tsuyoshi Fukaya, Kariya (JP); Mikio Iwase, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 34 days.

(21) Appl. No.: 14/902,259

(22) PCT Filed: Aug. 27, 2014

(86) PCT No.: PCT/JP2014/072410
§ 371 (c)(1),
(2) Date: Dec. 30, 2015

(87) PCT Pub. No.: WO2015/030046
PCT Pub. Date: Mar. 5, 2015

(65) Prior Publication Data
US 2016/0369870 A1  Dec. 22, 2016

(30) Foreign Application Priority Data

Aug. 30, 2013  (JP) .................................. 2013-179446

(51) Int. Cl.
*F16H 3/60* (2006.01)
*F16H 3/66* (2006.01)
(Continued)

(52) U.S. Cl.
CPC ............. *F16H 3/66* (2013.01); *F16H 57/043* (2013.01); *F16H 57/0426* (2013.01);
(Continued)

(58) Field of Classification Search
CPC ........................... F16H 57/0426; F16H 57/043
See application file for complete search history.

(56) References Cited

U.S. PATENT DOCUMENTS 4,759,234 A * 7/1988 Premiski ............... F16H 57/021
                                                                  384/905.1
5,607,371 A * 3/1997 Yamaguchi ........... F16H 37/022
                                                                       474/28
(Continued)

FOREIGN PATENT DOCUMENTS

| JP | 2003184964 A | 7/2003 |
| JP | 2011112127 A | 6/2011 |
| JP | 2013096559 A | 5/2013 |

OTHER PUBLICATIONS

Nov. 25, 2014 International Search Report issued in International Patent Application No. PCT/JP2014/072410.

*Primary Examiner* — Derek D Knight
(74) *Attorney, Agent, or Firm* — Oliff PLC (57) ABSTRACT

A speed change device that transmits power input to an input shaft to an output shaft while changing a speed ratio to a plurality of speeds, the speed change device including: a planetary gear mechanism including a sun gear, a ring gear, and a carrier that rotatably supports a plurality of pinion gears, each of the plurality of pinion gears meshing with at least one of the sun gear and the ring gear; and a brake including a brake hub fixed to the carrier and a friction plate fitted to an outer circumference of the brake hub, the brake being capable of holding the carrier stationary to a case.

8 Claims, 8 Drawing Sheets

(51) Int. Cl.
*F16H 57/04* (2010.01)
*F16H 57/08* (2006.01)

(52) U.S. Cl.
CPC ..... *F16H 57/0473* (2013.01); *F16H 57/0482* (2013.01); *F16H 57/0484* (2013.01); *F16H 57/082* (2013.01); *F16H 2200/0052* (2013.01); *F16H 2200/201* (2013.01); *F16H 2200/2043* (2013.01); *F16H 2200/2066* (2013.01); *F16H 2200/2082* (2013.01)

(56) References Cited

U.S. PATENT DOCUMENTS

| | | | | |
|---|---|---|---|---|
| 7,442,142 | B2* | 10/2008 | Kitahara | F16H 57/043 475/159 |
| 7,604,558 | B2* | 10/2009 | Okada | F16D 25/0638 184/6.12 |
| 8,002,660 | B2* | 8/2011 | Kato | F16H 57/0037 475/159 |
| 8,523,725 | B2* | 9/2013 | Torii | F16H 57/082 475/159 |
| 2009/0029820 | A1* | 1/2009 | Nishida | F16D 25/123 475/159 |
| 2011/0124461 | A1* | 5/2011 | Torii | F16H 57/082 475/159 |
| 2016/0281839 | A1* | 9/2016 | Torii | F16H 57/082 475/159 |

* cited by examiner

|   |      | C1 | C2 | B1 | B2 | B3  | F1 |
|---|------|----|----|----|----|-----|----|
|   | P    |    |    |    |    |     |    |
|   | REV  |    |    | O  |    | O   |    |
|   | N    |    |    |    |    |     |    |
| D | 1sp  | O  |    |    |    | (O) | O  |
|   | 2nd  | O  |    |    | O  |     |    |
|   | 3rd  | O  |    | O  |    |     |    |
|   | 4th  | O  | O  |    |    |     |    |
|   | 5th  |    | O  | O  |    |     |    |
|   | 6th  |    | O  |    | O  |     |    |

※(O): ENGAGEMENT AT THE TIME OF ENGINE BRAKE

SPEED CHANGE DEVICE

BACKGROUND

The present disclosure relates to a speed change device.

Conventionally, for this type of speed change device, a speed change device including a planetary gear mechanism, which includes a sun gear, a ring gear, a plurality of pinion gears, and a carrier; and a brake that is disposed on an outer circumferential side of the planetary gear mechanism and that can hold the carrier stationary to a case (for example, see Japanese Patent Application Publication No. 2013-96559 and Japanese Patent Application Publication No. H2-146343) has been proposed.

In the speed change device described in Japanese Patent Application Publication No. 2013-96559, a brake hub of the brake includes an outer circumferential portion having a cylindrical shape that surrounds the outer circumferential side of the ring gear, and an inner circumferential portion that extends toward a radially inner side from one end in an axial direction of the outer circumferential portion. Furthermore, an oil hole, through which lubricating oil passes, is formed on the ring gear and the outer circumferential portion of the brake hub. Furthermore, each pinion gear is rotatably supported by the carrier and the inner circumferential portion of the brake hub. With this configuration, the lubricating oil inside the planetary gear mechanism is supplied to the brake through the oil hole, thereby causing lubrication and cooling of the brake to be carried out.

In the speed change device described in Japanese Patent Application Publication No. H2-146343, the brake hub of the brake includes an outer circumferential portion in a cylindrical shape that surrounds the outer circumferential side of the ring gear, and an inner circumferential portion that extends toward a radially inner side from one end in an axial direction of the outer circumferential portion. The carrier includes a carrier main body and a carrier cover. The carrier main body includes a planar portion that supports one end of a pinion shaft inserted to each pinion gear, a plurality of leg portions extending in the axial direction at intervals in the circumferential direction from the outer circumference of the planar portion, and a connecting portion that connects the planar portion and the leg portions. The carrier cover is fixed to the plurality of leg portions and supports the other end of each of the pinion shafts. Furthermore, a portion between the two adjacent leg portions in the outer circumference of the planar portion of the carrier main body and the inner circumference of the inner circumferential portion of the brake hub are fixed, where a space is formed between the outer circumferential surface of the connecting portion of the carrier main body and the inner circumferential surface of the inner circumferential portion of the brake hub.

SUMMARY

In the speed change device described in Japanese Patent Application Publication No. 2013-96559, the lubricating oil may be accumulated at the periphery of the pinion gear of the planetary gear mechanism since both axial sides of the pinion gear are substantially blocked by the carrier and the inner circumferential portion of the brake hub. Furthermore, in the speed change device described in Japanese Patent Application Publication No. H2-146343, the lubricating oil may not be sufficiently discharged from the inside to the outside of the planetary gear mechanism through the space formed by the outer circumferential surface of the connecting portion of the carrier main body and the inner circumferential surface of the inner circumferential portion of the brake hub depending on how the pinion gear and the ring gear mesh with each other, and hence the lubricating oil may be accumulated to a certain extent at the periphery of the pinion gear of the planetary gear mechanism, and the like. When the temperature of the lubricating oil accumulated at the periphery of the pinion gear becomes high, the pinion gear, and the like may not be sufficiently cooled, thereby easily causing wear of the pinion shaft and the like inserted to the pinion gear.

A speed change device according to an exemplary aspect of the present disclosure suppresses the wear of the pinion shaft and the like inserted to the pinion gear configuring the planetary gear mechanism.

A speed change device according to an exemplary aspect of the present disclosure is a speed change device that transmits power input to an input shaft to an output shaft while changing a speed ratio to a plurality of speeds, the speed change device including: a planetary gear mechanism including a sun gear, a ring gear, and a carrier that rotatably supports a plurality of pinion gears, each of the plurality of pinion gears meshing with at least one of the sun gear and the ring gear; and a brake including a brake hub fixed to the carrier and a friction plate fitted to an outer circumference of the brake hub, the brake being capable of holding the carrier stationary to a case; in which the ring gear includes a lubricating oil supplying hole through which lubricating oil passes; the brake hub includes a tubular portion that surrounds an outer circumference of the ring gear and that includes a lubricating oil flowing hole that causes the lubricating oil from the lubricating oil supplying hole to flow, and a flange portion that extends toward a radially inner side from the tubular portion; the carrier includes a carrier main body and a carrier cover, the carrier main body including a planar portion that supports one end of each of a plurality of pinion shafts inserted to each of the plurality of pinion gears, a plurality of leg portions extending in an axial direction at intervals in a circumferential direction from an outer circumference of the planar portion, and a connecting portion that connects the leg portions and the planar portion, and the carrier cover fixed to the leg portions and supporting the other end of each of the plurality of pinion shafts; the planar portion includes an outer circumferential fixing portion formed between the two adjacent leg portions in the outer circumference and fixed to an inner circumference of the flange portion; a space is formed between an outer circumferential surface of the connecting portion and an inner circumferential surface of the flange portion; and the ring gear and the pinion gears are configured as helical gears, and mesh with each other such that the lubricating oil is directed toward the flange portion in the axial direction when a vehicle is travelling forward.

In the speed change device of the present disclosure, a lubricating oil supplying hole through which the lubricating oil passes is formed in the ring gear of the planetary gear mechanism, and a lubricating oil flowing hole that causes the lubricating oil from the lubricating oil supplying hole to flow is formed in the tubular portion that surrounds the outer circumference of the ring gear in the brake hub. Furthermore, a space (hereinafter referred to as a "predetermined space") is formed between the outer circumferential surface of the connecting portion that connects the planar portion and each of the leg portions in the carrier main body of the carrier, and the inner circumferential surface of the flange portion of the brake hub. Accordingly, the lubricating oil in the planetary gear mechanism (at the periphery of the pinion gear, etc.) is supplied toward the brake through the lubricating oil supplying hole, and the lubricating oil flows between the inside and the outside of the planetary gear mechanism through the predetermined space. Therefore, accumulation of the lubricating oil in the planetary gear mechanism (at the periphery of the pinion gear, etc.) can be suppressed (the amount of accumulation can be reduced). Moreover, the ring gear and the pinion gear are configured as helical gears, and mesh with each other such that the lubricating oil is directed toward the flange portion in the axial direction when the vehicle is travelling forward. Thus, the lubricating oil can be more easily discharged from the inside to the outside of the planetary gear mechanism through the predetermined space. As a result, increase in the oil temperature in the planetary gear mechanism (temperature of the pinion gear, the pinion shaft, etc.) can be further suppressed, and the wear of the pinion shaft, and the like can be further suppressed. Therefore, lower specification of the pinion shaft and lower cost of the entire device can be achieved.

In such speed change device of the present disclosure, the flange portion may project toward the radially inner side with respect to a bottom land (bottom surface of a tooth space) between gear teeth of the ring gear. The lubricating oil that has flowed toward the flange portion from between the pinion gear and the ring gear then can be received at the flange portion, and supplied to the brake through the flange portion, the inner circumferential side of the tubular portion, and the lubricating oil flowing hole. As a result, the brake can be more satisfactorily lubricated and cooled.

Furthermore, in the speed change device of the present disclosure, the carrier cover may include a second planar portion that supports the other ends of the plurality of pinion shafts, and a cylindrical portion extending toward a side opposite to the planar portion in the axial direction from an inner circumferential portion of the second planar portion; the ring gear may be supported by an annular coupling member on the cylindrical portion side of the second planar portion in the axial direction; and the coupling member can be rotatably supported by the cylindrical portion. In this case, the lubricating oil tends to be more easily accumulated in the planetary gear mechanism by the annular coupling member. Therefore, it is more advantageous to form the predetermined space and mesh the ring gear and the pinion gear such that the lubricating oil is directed toward the flange portion in the axial direction from the meshing portion of the ring gear and the pinion gear when the vehicle is travelling forward.

In the speed change device of the present disclosure, the connecting portion may be formed in an arcuate cross-section shape by press working. Accordingly, the connecting portion that forms the predetermined space with the inner circumferential surface of the flange portion of the brake hub can be easily formed.

Furthermore, in the speed change device of the present disclosure, the flange portion may include each of a plurality of inner circumferential fixing portions, to which the outer circumferential fixing portion of the planar portion is fixed, and a plurality of projections that each projects toward the radially inner side between the two adjacent inner circumferential fixing portions. The lubricating oil that has flowed toward the flange portion from between the pinion gear and the ring gear then can be received more at the flange portion.

DETAILED DESCRIPTION OF EMBODIMENTS

A mode for carrying out the disclosure will now be described using embodiments.

Figure 1:
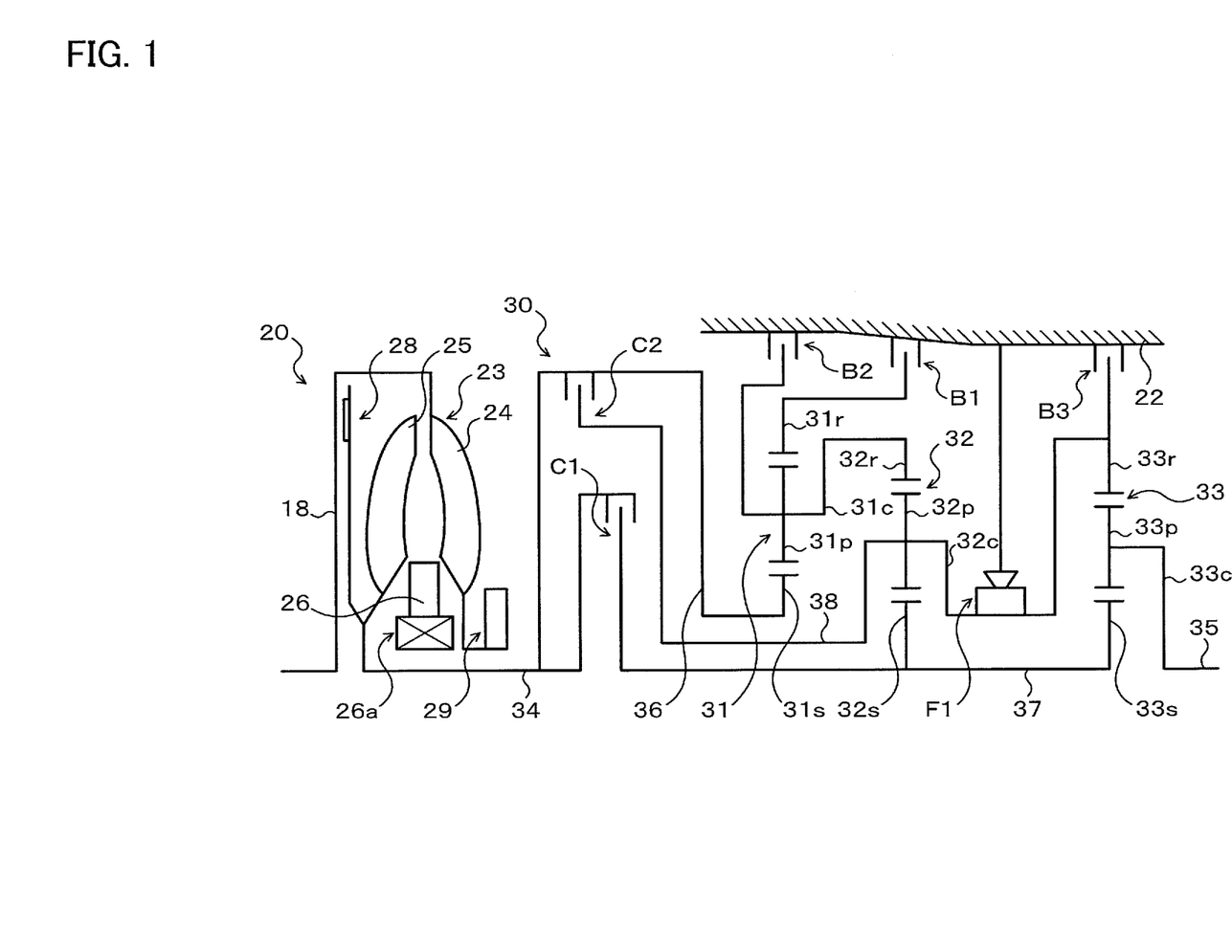
FIG. 1 is a structural diagram showing an outline of a configuration of a power transmitting apparatus including a speed change device serving as one embodiment of the present disclosure.

FIG. 1 is a structural diagram showing an outline of a configuration of a power transmitting apparatus 20 including a speed change device 30 serving as one embodiment of the present disclosure. The power transmitting apparatus 20 of the embodiment is mounted on a rear wheel drive vehicle, and is configured as an apparatus that transmits power from an engine serving as a motor to a drive wheel through a differential mechanism (differential gear). As shown in FIG. 1, the power transmitting apparatus 20 includes a fluid transmitting device (starting device) 23, an oil pump 29, the stepped speed change device (automatic transmission) 30, and a transmission case 22 for accommodating such components.

The fluid transmitting device 23 is configured as a fluid torque converter, and includes a pump impeller 24 connected to a crankshaft of the engine through a front cover 18, a turbine runner 25 connected to an input shaft 34 of the speed change device 30 through a turbine hub, a stator 26 that is disposed on the inner side of the pump impeller 24 and the turbine runner 25 to rectify the flow of hydraulic oil (ATF) from the turbine runner 25 to the pump impeller 24, a one-way clutch 26a that restricts the rotating direction of the stator 26 to one direction, a damper mechanism (not shown), a lock-up clutch 28, and the like. The fluid transmitting device 23 may be configured as a fluid coupling that does not include the stator 26.

The oil pump 29 is configured as a gear pump, and includes a pump assembly including a pump body and a pump cover, and an external gear connected to the pump impeller 24 of the fluid transmitting device 23 through the hub. The oil pump 29 is driven by the power from the engine, and the hydraulic oil (ATF) stored in an oil pan (not shown) is taken in and supplied (pressure fed) to a hydraulic control device (not shown).

The speed change device 30 is configured as a six-speed transmission, and includes a first planetary gear mechanism 31, a second planetary gear mechanism 32, and a third planetary gear mechanism 33, all of which are single pinion type planetary gears, the input shaft 34, an output shaft 35, and two clutches C1, C2, three brakes B1, B2, B3 and the one-way clutch F1 for changing the power transmission path from the input shaft 34 to the output shaft 35. The first to third planetary gear mechanisms 31 to 33, the clutches C1, C2, the brakes B1 to B3 and the one-way clutch F1 are accommodated inside the transmission case 22. The input shaft 34 of the speed change device 30 is coupled to the crankshaft of the engine via the fluid transmitting device 23, and the output shaft 35 is coupled to the drive wheel via the differential mechanism (differential gear).

The first planetary gear mechanism 31 is disposed closest to the engine side (vehicle front side) among the first to third planetary gear mechanisms 31 to 33, that is, closest to the input shaft 34, and configures a speed change gear mechanism with the next-nearest second planetary gear mechanism 32. The first planetary gear mechanism 31 includes a first sun gear 31$s$, which is an external gear, a first ring gear 31$r$ serving as a fixable element, which is an internal gear concentrically disposed with the first sun gear 31$s$, and a first carrier 31$c$ that rotatably and revolvably supports a plurality of first pinion gears 31$p$ meshing with the first sun gear 31$s$ and meshing with the first ring gear 31$r$. The first sun gear 31$s$ of the first planetary gear mechanism 31 is fixed to an annular coupling drum 36 coupled (spline fitted) to a clutch drum of the clutch C1 that can rotate together with the input shaft 34.

The second planetary gear mechanism 32 is arranged side by side on the output shaft 35 side (vehicle rear side) of the first planetary gear mechanism 31. The second planetary gear mechanism 32 includes a second sun gear 32$s$, which is an external gear, a second ring gear 32$r$ serving as a fixable element, which is an internal gear concentrically disposed with the second sun gear 32$s$, and a second carrier 32$c$ that rotatably and revolvably supports a plurality of second pinion gears 32$p$ meshing with the second sun gear 32$s$ and meshing with the second ring gear 32$r$. The second sun gear 32$s$ of the second planetary gear mechanism 32 is fixed to a hollow intermediate shaft 37 rotatably disposed with respect to the input shaft 34 and the output shaft 35 between the input shaft 34 and the output shaft 35. The second ring gear 32$r$ of the second planetary gear mechanism 32 is coupled to the first carrier 31$c$ of the first planetary gear mechanism 31. The second carrier 32$c$ of the second planetary gear mechanism 32 is fixed to a sleeve 38 coaxially and rotatably supported by the intermediate shaft 37.

The third planetary gear mechanism 33 is disposed closest to the output shaft 35 (vehicle rear side) among the first to third planetary gear mechanisms 31 to 33 and functions as a reduction gear mechanism. The third planetary gear mechanism 33 includes a third sun gear 33$s$, which is an external gear, a third ring gear 33$r$ serving as a fixable element, which is an internal gear concentrically disposed with the third sun gear 33$s$, and a third carrier 33$c$ that rotatably and revolvably supports a plurality of third pinion gears 33$p$ meshing with the third sun gear 33$s$ and meshing with the third ring gear 33$r$. The third sun gear 33$s$ of the third planetary gear mechanism 33 is fixed to the intermediate shaft 37 and coupled to the second sun gear 32$s$ of the second planetary gear mechanism 32. The third ring gear 33$r$ of the third planetary gear mechanism 33 is coupled to the second carrier 32$c$ of the second planetary gear mechanism 32, and the third carrier 33$c$ of the third planetary gear mechanism 33 is coupled to the output shaft 35.

The clutch C1 is a multi-plate hydraulic clutch that can couple and uncouple the input shaft 34 and the intermediate shaft 37, that is, the second sun gear 32$s$ of the second planetary gear mechanism 32 and the third sun gear 33$s$ of the third planetary gear mechanism 33. The clutch C2 is a multi-plate hydraulic clutch that can couple and uncouple the input shaft 34 and the sleeve 38, that is, the second carrier 32$c$ of the second planetary gear mechanism 32. The one-way clutch F1 allows only the forward rotation of the second carrier 32$c$ of the second planetary gear mechanism 32 and the third ring gear 33$r$ of the third planetary gear mechanism 33 and regulates the reverse rotation.

The brake B1 is a multi-plate hydraulic brake that can hold the first ring gear 31$r$ of the first planetary gear mechanism 31 stationary to the transmission case 22 and that can release the first ring gear 31$r$ which has been held stationary to the transmission case 22. The brake B2 is a multi-plate hydraulic brake that can hold the second ring gear 32$r$ of the second planetary gear mechanism 32 stationary to the transmission case 22 by holding the first carrier 31$c$ of the first planetary gear mechanism 31 stationary to the transmission case 22 and that can release the first carrier 31$c$ and the second ring gear 32$r$ which have been held stationary to the transmission case 22. The brake B3 is a multi-plate hydraulic brake that can hold the second carrier 32$c$ of the second planetary gear mechanism 32 and the third ring gear 33$r$ of the third planetary gear mechanism 33 stationary to the transmission case 22 and that can release the second carrier 32$c$ and the third ring gear 33$r$ which have been held stationary to the transmission case 22.

Figure 2:
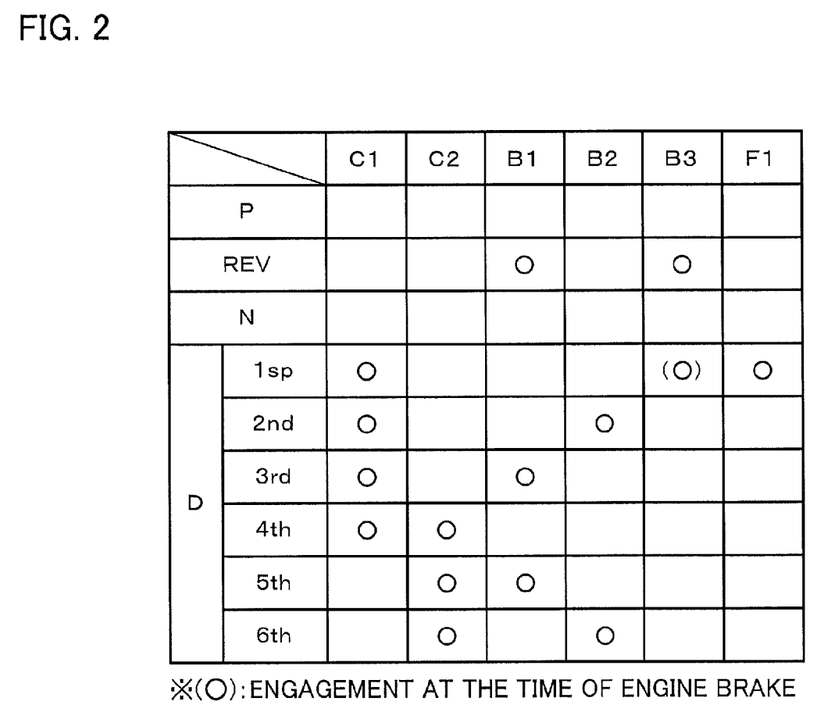
FIG. 2 is an explanatory view showing an operation table representing the relationship of shift speeds and the operation states of clutches and brakes of the speed change device.
Figure 3:
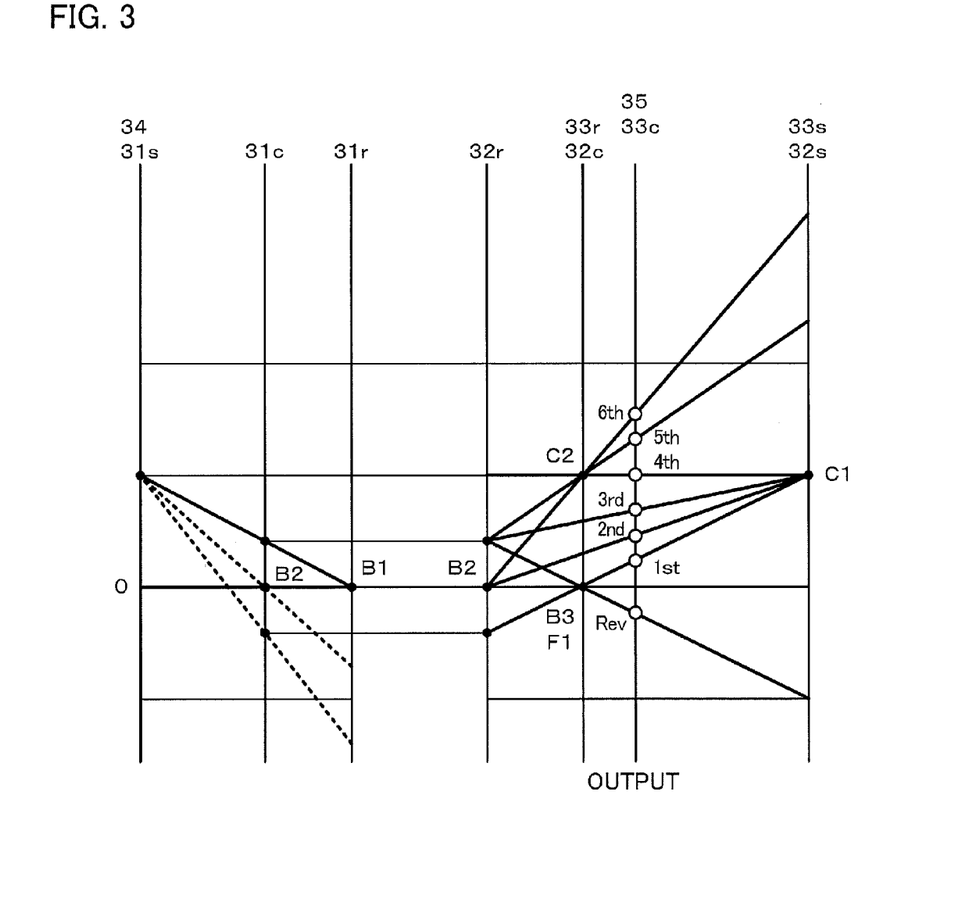
FIG. 3 is a collinear diagram illustrating the relationship in the number of rotations between rotating elements configuring the speed change device.

The clutches C1, C2 and the brakes B1 to B3 operate through the supply and discharge of the hydraulic oil by the hydraulic control device. FIG. 2 shows an operation table representing the relationship of shift speeds and the operation states of clutches C1, C2 and brakes B1 to B3 of the speed change device 30. FIG. 3 shows a collinear diagram illustrating the relationship in the number of rotations between rotating elements configuring the speed change device 30. As shown in FIG. 3, the speed change device 30 provides first to sixth forward speeds and one reverse speed by setting the clutches C1, C2 and the brakes B1 to B3 to the states shown in the operation table of FIG. 2.

Figure 4:
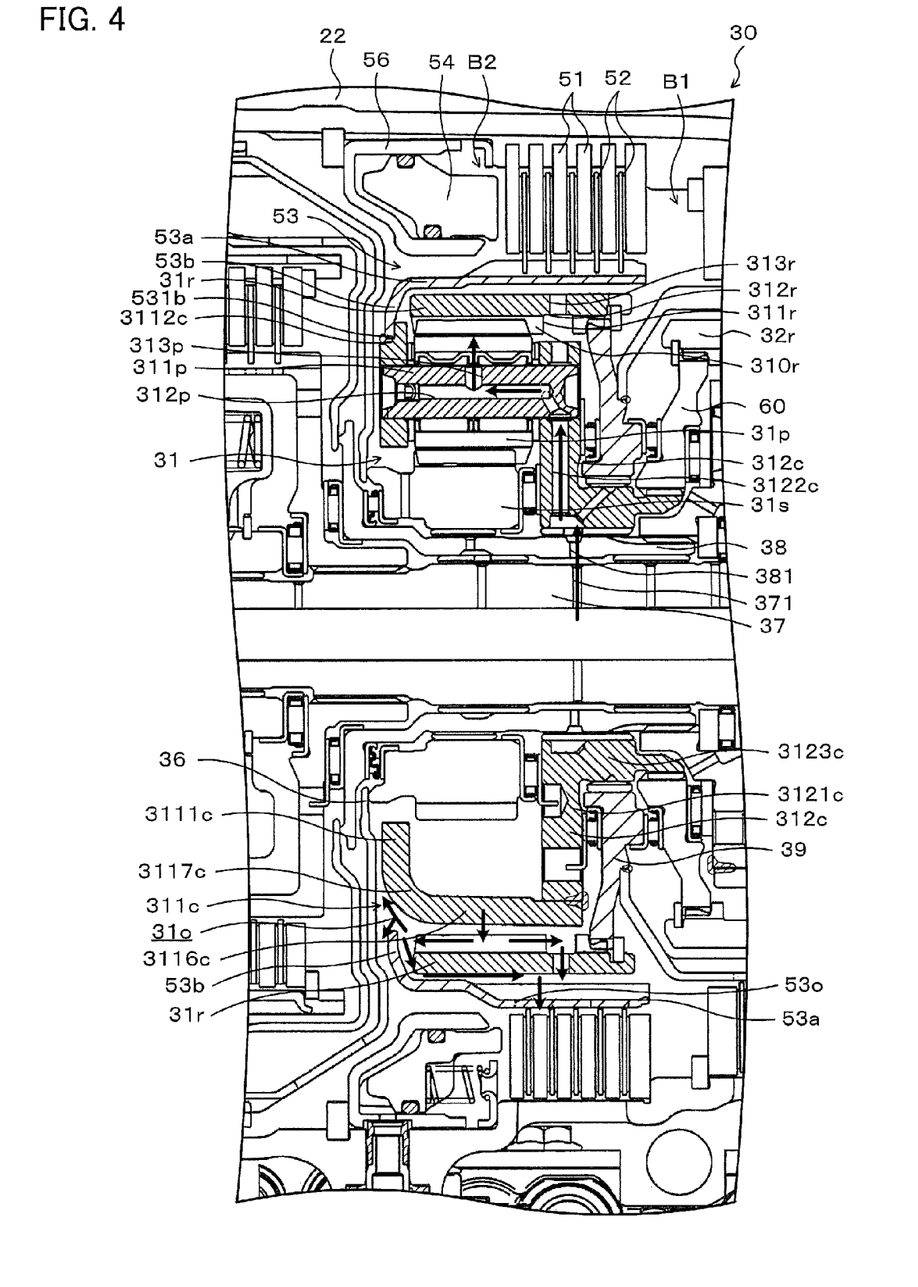
FIG. 4 is a partial cross-sectional view showing the brake and the periphery of a first planetary gear mechanism of the speed change device.
Figure 5:
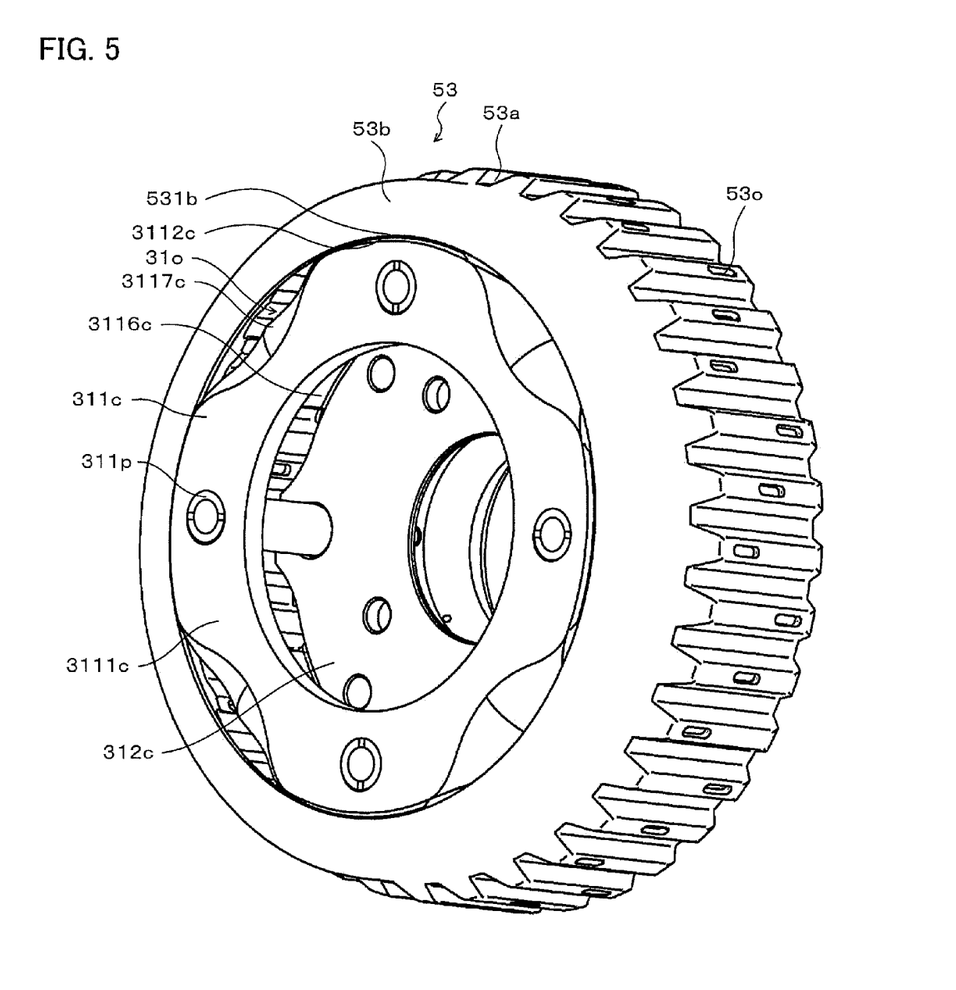
FIG. 5 is a perspective view of a first carrier, a first pinion shaft, and a brake hub.
Figure 6:
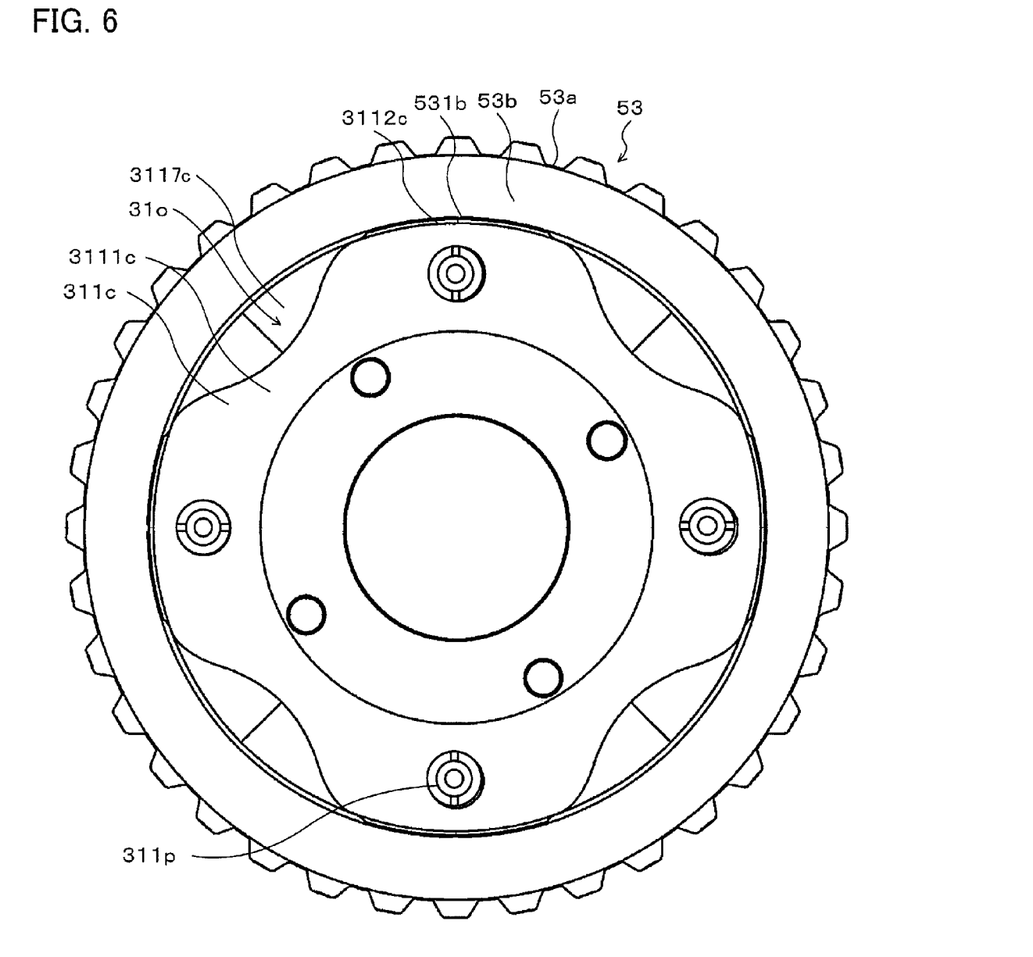
FIG. 6 is a front view of the first carrier, the first pinion shaft, and the brake hub.
Figure 7:
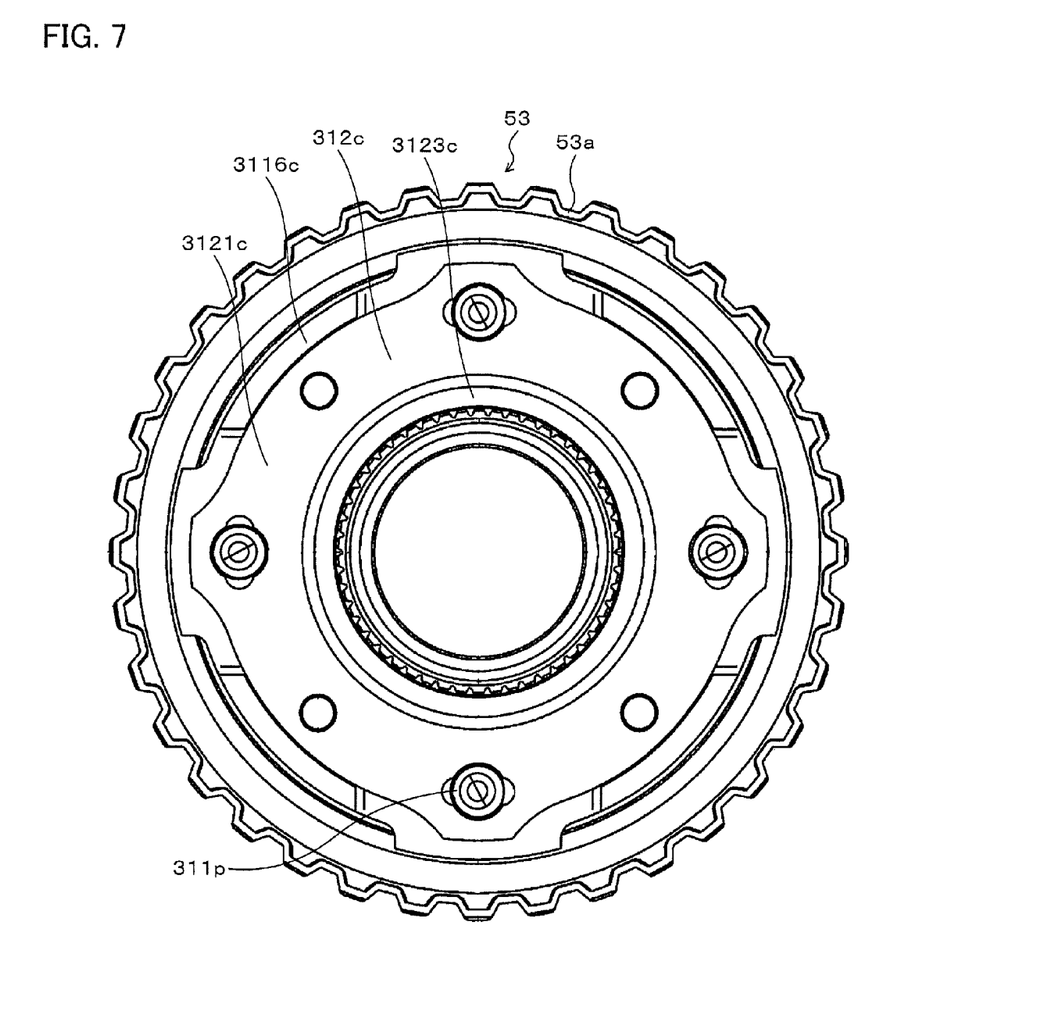
FIG. 7 is a rear view of the first carrier, the first pinion shaft, and the brake hub.

FIG. 4 is a partial cross-sectional view showing the brake B2 and the periphery of the first planetary gear mechanism 31 of the speed change device 30. FIGS. 5 to 7 are, respectively, a perspective view, a front view (view seen from the carrier main body 311$c$ side), and a rear view (view seen from the carrier cover 312$c$ side) of the first carrier 31$c$, the first pinion shaft 311$p$, and the brake hub 53.

As shown in FIG. 4, the brake B2 includes a plurality of friction mating plates 51 fitted (spline fitted) to the inner circumferential portion of the transmission case 22 and slidably supported by the transmission case 22; a plurality of friction plates (member having a friction material on both sides) 52 each disposed between the two friction mating plates 51 adjacent to each other; a brake hub 53 coupled to the second ring gear 32$r$ of the second planetary gear mechanism 32 to be fastened (fixed), via a coupling member 60 and the first carrier 31$c$ of the first planetary gear mechanism 31 and to which the plurality of friction plates 52 is fitted (spline fitted); a piston 54 that moves in the axial direction with respect to the transmission case 22 and that can press the friction mating plates 51 and the friction plates 52; a plurality of return springs (not shown) that urges the piston 54 in the axial direction so as to separate from the friction mating plates 51 and the friction plates 52; and an oil chamber defining member 56 that is fixed to the transmission case 22 and that defines an engagement oil chamber behind (left side in the figure) the piston 54.

The brake hub 53 includes a cylindrical tubular portion 53$a$, to which the plurality of friction plates 52 is fitted, on the outer circumferential side, and a flange portion 53$b$ that extends toward a radially inner side from one end (end on the left side in FIG. 4) of the tubular portion 53$a$. The flange portion 53$b$ is formed such that the inner diameter thereof becomes smaller than the outer diameter of the bottom land between gear teeth 310r of the first ring gear 31r of the first planetary gear mechanism 31, that is, so as to project toward the radially inner side with respect to the bottom land between the gear teeth 310r of the first ring gear 31r.

A part of the friction mating plates 51 and the friction plates 52 of the brake B2, the tubular portion 53a of the brake hub 53, a part of the piston 54, and a part of the oil chamber defining member 56 are disposed on the outer circumferential side of the first planetary gear mechanism 31 so as to overlap the first planetary gear mechanism 31 as seen from the radial direction. In other words, the tubular portion 53a of the brake hub 53 is disposed so as to surround the outer circumference of the first ring gear 31r of the first planetary gear mechanism 31, and more than half of the plurality of friction plates 52 is fitted to the tubular portion 53a so as to overlap the first ring gear 31r as seen from the radial direction.

The first sun gear 31s, the first pinion gear 31p, and the first ring gear 31r of the first planetary gear mechanism 31 are configured as helical gears. The direction of helix of the gear teeth of the first pinion gear 31p and the first ring gear 31r is defined such that the lubricating oil is directed from a meshing portion of the first pinion gear 31p and the first ring gear 31r toward the flange portion 53b (left side in FIG. 4) in the axial direction when the vehicle is travelling forward. In other words, the first pinion gear 31p and the first ring gear 31r mesh with each other such that the lubricating oil is directed from the meshing portion of the first pinion gear 31p and the first ring gear 31r toward the flange portion 53b in the axial direction when the vehicle is travelling forward.

The first carrier 31c of the first planetary gear mechanism 31 includes a carrier main body 311c that rotatably supports one end (end on the left side in FIG. 4) of each of the plurality of first pinion shafts 311p inserted to each of the plurality of first pinion gears 31p, and a carrier cover 312c that rotatably supports the other end (end on the right side in FIG. 4) of each of the first pinion shafts 311p.

As shown in FIGS. 4 to 6, the carrier main body 311c includes a planar portion 3111c that supports one end of the first pinion shaft 311p, a plurality of (four in the embodiment) leg portions 3116c extending toward the right side in FIG. 4 in the axial direction at intervals in the circumferential direction from the outer circumference of the planar portion 3111c, and connecting portions 3117c (interposed between the planar portion 3111c and the leg portions 3116c) that connect the planar portion 3111c and the leg portions 3116c. In the planar portion 3111c, each of a plurality of (four in the embodiment) outer circumferential fixing portions 3112c formed between two adjacent leg portions 3116c at the outer circumference are fixed (welded) to each of a plurality of (four in the embodiment) inner circumferential fixing portions 531b formed at the inner circumference of the flange portion 53b of the brake hub 53.

In the carrier main body 311c, the connecting portion 3117c between the planar portion 3111c and the leg portion 3116c is formed in an arcuate cross-section shape (so-called shear drop shape), as shown in FIGS. 4 and 5, by performing press working on a plate body. The connecting portion 3117c (portion in an arcuate cross-section shape) is extended so as to have an arcuate cross-section shape on the radially outer side and the right side in FIG. 4 in the axial direction from the position on the radially inner side with respect to the outer circumferential fixing portion 3112c in the planar portion 3111c, and is connected to the leg portion 3116c at the position on the right side in FIG. 4 with respect to the thickness (axial length) of the inner circumferential portion of the flange portion 53b. Therefore, a space 31o is formed between the outer circumferential surface of the connecting portion 3117c and the inner circumferential surface of the flange portion 53b of the brake hub 53. In the embodiment, the space 31o is formed by forming the connecting portion 3117c to have an arcuate cross-section shape by press working and fixing (welding) the outer circumferential fixing portion 3112c of the planar portion 3111c and the inner circumferential fixing portion 531b of the flange portion 53b, and hence the connecting portion 3117c and the space 31o can be easily formed.

As shown in FIGS. 4 and 7, the carrier cover 312c includes a planar portion 3121c that supports the other end of the first pinion shaft 311p, and a cylindrical portion 3123c that extends toward the right side in FIG. 4 (side opposite to the planar portion 3111c of the carrier main body 311c) in the axial direction from the inner circumferential portion of the planar portion 3121c.

As shown in FIGS. 4 and 7, the first carrier 31c is integrally configured by fixing (welding) the inner circumference of the free end of the leg portion 3116c of the carrier main body 311c and the outer circumference of the carrier cover 312c.

As shown in FIG. 4, a ring gear flange (coupling member) 39 is fitted (spline fitted) to the spline formed at the right end in FIG. 4 of the first ring gear 31r of the first planetary gear mechanism 31. The first ring gear 31r is supported on the cylindrical portion 3123c side (right side in FIG. 4) with respect to the planar portion 3121c in the axial direction by the ring gear flange 39. Furthermore, the ring gear flange 39 is rotatably supported by the cylindrical portion 3123c of the carrier cover 312c.

In the embodiment, the left side in FIG. 4 (flange portion 53b side) of the first planetary gear mechanism 31 is closed to a certain extent by the outer circumferential fixing portion 3112c of the carrier main body 311c and the inner circumferential fixing portion 531b of the flange portion 53b of the brake hub 53, and the inside and the outside of the first planetary gear mechanism 31 are communicated by the space 31o. The right side in FIG. 4 of the first planetary gear mechanism 31 is substantially closed by the ring gear flange 39.

The oil passage (oil hole) of the hydraulic oil for lubricating and cooling each gear, the brake B2, and the like of the first planetary gear mechanism 31 will now be described.

As shown in FIG. 4, the intermediate shaft 37 includes an oil passage 371 for supplying the hydraulic oil from the hydraulic control device, which is supplied to the inside of the intermediate shaft 37, to the first planetary gear mechanism 31, the brake B2, and the like as the lubricating and cooling oil. The planar portion 3121c of the carrier cover 312c of the first carrier 31c includes a radial oil passage 3122c that extends in the radial direction to communicate with the oil passage 371 of the intermediate shaft 37 via an oil hole 381 formed in the sleeve 38. The first pinion shaft 311p includes an in-shaft oil passage 312p that extends in the axial direction and communicates with the radial oil passage 3122c of the carrier cover 312c, and a radial oil passage 313p that communicates the in-shaft oil passage 312p and the bottom land between the gear teeth of the first pinion gear 31p at substantially a center portion in the axial direction of the first pinion shaft 311p.

In the gear teeth 310r of the first ring gear 31r of the first planetary gear mechanism 31, recesses 311r are formed so as to be adjacent to each other in the circumferential direction. The recess 311r is formed at a position in which the recess 311r does not mesh with the first pinion gear 31p in the axial direction of the gear teeth 310r (in the embodiment, at a position on the outer circumferential side of the planar portion 3121c of the carrier cover 312c). Furthermore, the first ring gear 31r includes a groove 312r that is slightly recessed with respect to the bottom land (bottom surface of the tooth space) between the gear teeth 310r, over the entire periphery of the recesses 311r. Moreover, in the first ring gear 31r, a plurality of lubricating oil supplying holes 313r that communicate the groove 312r and the outer circumferential side of the first ring gear 31r is formed so as to be spaced apart in the circumferential direction. The lubricating oil supplying hole 313r may communicate the recesses 311r and the outer circumferential side of the first ring gear 31r, or may communicate the bottom land (bottom surface of the tooth space) between the gear teeth 310r and the outer circumferential side of the first ring gear 31r.

As described above, the space 31o is formed between the outer circumferential surface of the connecting portion 3117c that connects the planar portion 3111c and the leg portion 3116c in the carrier main body 311c of the first carrier 31c of the first planetary gear mechanism 31, and the inner circumferential surface of the flange portion 53b of the brake hub 53. The space 31o allows the hydraulic oil to flow between the inside and the outside of the first planetary gear mechanism 31.

The tubular portion 53a of the brake hub 53 includes a plurality of lubricating oil flowing holes 53o formed at intervals in the circumferential direction and the axial direction at the top portions of the spline to which the friction plate 52 is fitted. The lubricating oil flowing hole 53o may be formed at the bottom portions of the spline.

Next, lubricating and cooling of the first planetary gear mechanism 31 and the brake B2 at the time of travelling when the vehicle is travelling forward (in particular, first forward speed, second forward speed, fourth forward speed, and sixth forward speed in which the first ring gear 31r of the first planetary gear mechanism 31 is not held stationary by the brake B1) will now be described.

As shown with an arrow in FIG. 4, when the vehicle is travelling forward, the hydraulic oil is supplied from the oil passage 371 of the intermediate shaft 37 to the meshing portion of the first pinion gear 31p and the first ring gear 31r, as well as the meshing portion of the first pinion gear 31p and the first sun gear 31s through the radial oil passage 3122c of the planar portion 3121c of the carrier cover 312c, the in-shaft oil passage 312p and the radial oil passage 313p of the first pinion shaft 311p, and the like as the lubricating and cooling oil. At the meshing portion of the first pinion gear 31p and the first ring gear 31r, the hydraulic oil is directed toward the flange portion 53b (left side in the figure) of the brake hub 53 by the meshed first pinion gear 31p and the first ring gear 31r configured as helical gears, but a part of the hydraulic oil flows into the recess 311r and the groove 312r formed in each of the gear teeth 310r of the first ring gear 31r. The hydraulic oil accumulated in the recess 311r and the groove 312r is discharged toward the radially outer side through the lubricating oil supplying hole 313r by the centrifugal force generated with the rotation of the first ring gear 31r, and supplied to the friction mating plates 51 and the friction plates 52 of the brake B2 through the lubricating oil flowing hole 53o formed in the tubular portion 53a of the brake hub 53. A part of the hydraulic oil directed toward the flange portion 53b at the meshing portion of the first pinion gear 31p and the first ring gear 31r is received by the flange portion 53b of the brake hub 53 formed to project toward the radially inner side with respect to the bottom land between the gear teeth 310r of the first ring gear 31r. The hydraulic oil received by the flange portion 53b flows toward the radially outer side along the inner circumference of the tubular portion 53a and supplied to the brake B2 via the lubricating oil flowing hole 53o. Furthermore, the remaining hydraulic oil directed toward the flange portion 53b is discharged to the outside of the first planetary gear mechanism 31 through the space 31o formed by the outer circumferential surface of the connecting portion 3117c that connects the planar portion 3111c and the leg portion 3116c of the carrier main body 311c, and the inner circumferential surface of the flange portion 53b of the brake hub 53.

In other words, in the embodiment, in addition to the hydraulic oil (lubricating and cooling oil) in the first planetary gear mechanism 31 being supplied toward the brake B2 through the lubricating oil supplying hole 313r of the first ring gear 31r, the hydraulic oil flows between the inside and the outside of the first planetary gear mechanism 31 through the space 31o. Thus, compared to the configuration in which both sides in the axial direction of the first pinion gear 31p are substantially closed (the space 31o is not provided) by the carrier main body 311c of the first carrier 31c, the flange portion 53b of the brake hub 53, and the carrier cover 312c, accumulation of the hydraulic oil can be suppressed (reduce accumulation amount) in the first planetary gear mechanism 31 (the periphery of the first pinion gear 31p, etc.). Furthermore, in the embodiment, the first pinion gear 31p and the first ring gear 31r are both configured as helical gears, and mesh with each other such that the lubricating oil is directed toward the flange portion 53b in the axial direction from the meshing portion of the first pinion gear 31p and the first ring gear 31r when the vehicle is travelling forward. Thus, the lubricating oil can be more easily discharged from the inside to the outside of the first planetary gear mechanism 31 through the space 31o. Consequently, an increase in the oil temperature in the first planetary gear mechanism 31 (temperature of the first pinion gear 31p and the first pinion shaft 311p) can be further suppressed, and the wear of the first pinion shaft 311p, and the like can be further suppressed. In the embodiment, the left side in FIG. 4 (flange portion 53b side) of the first planetary gear mechanism 31 is closed to a certain extent by the outer circumferential fixing portion 3112c of the carrier main body 311c and the inner circumferential fixing portion 531b of the brake hub 53 (the inside and outside of the first planetary gear mechanism 31 communicated by the space 31o), and the right side in FIG. 4 of the first planetary gear mechanism 31 is substantially closed by the ring gear flange 39. Therefore, since the lubricating oil tends to be easily accumulated in the first planetary gear mechanism 31, it is more advantageous to form the space 31o and mesh the first pinion gear 31p and the first ring gear 31r such that the lubricating oil is directed toward the flange portion 53b (space 31o) from the meshing portion of the first pinion gear 31p and the first ring gear 31r. Accordingly, lower specification of the first pinion shaft 311p and lower cost of the entire device are achieved.

The effect is significant particularly when the lubricating oil to be supplied from the first planetary gear mechanism 31 toward the brake B2 through the lubricating oil supplying hole 313r of the first ring gear 31r is likely to be reduced (for example, when the first ring gear 31r is at low rotation). In the configuration without the space 31o, most of the hydraulic oil in the first planetary gear mechanism 31 is supplied toward the brake B2 through the lubricating oil supplying hole 313r, and hence an excessive amount of the hydraulic oil may be supplied to the brake B2 when the number of rotations of the first ring gear 31r is high (centrifugal force acting on the hydraulic oil on the inner circumferential side is large), and the like. Thus, the dragging loss by the friction plate 52 may become large or the transmission efficiency of the power of the entire device may be lowered by agitation of the hydraulic oil by the brake hub 53 when the vehicle is travelling in the first forward speed and fourth speed, and the like at which the brake B2 is not engaged and the first ring gear 31r is rotated. In the embodiment, on the other hand, the hydraulic oil flows between the inside and the outside of the first planetary gear mechanism 31 through the space 31o, so that an excessive amount of the hydraulic oil can be suppressed from being supplied to the brake B2. As a result, an increase in the dragging loss by the friction plate 52 can be suppressed, and a reduction in the transmission efficiency of the power of the entire device can be suppressed.

Moreover, in the embodiment, a part of the hydraulic oil directed toward the flange portion 53b at the meshing portion of the first pinion gear 31p and the first ring gear 31r is received by the flange portion 53b of the brake hub 53, and supplied to the brake B2 through the flange portion 53b, the inner circumference of the tubular portion 53a, and the lubricating oil flowing hole 53o. Thus, a sufficient amount of hydraulic oil can be supplied by the brake B2. As a result, even when a relatively large torque capacity is requested on the brake B2, the brake B2 can be more satisfactorily lubricated and cooled.

In the speed change device 30 of the embodiment described above, the lubricating oil supplying hole 313r is formed in the first ring gear 31r of the first planetary gear mechanism 31, and the lubricating oil flowing hole 53o is formed in the tubular portion 53a of the brake hub 53 of the brake B2. Furthermore, the space 31o is formed between the outer circumferential surface of the connecting portion 3117c that connects the planar portion 3111c and the leg portion 3116c in the carrier main body 311c of the first carrier 31c of the first planetary gear mechanism 31, and the inner circumferential surface of the flange portion 53b of the brake hub 53. Thus, in addition to the hydraulic oil (lubricating and cooling oil) in the first planetary gear mechanism 31 being supplied toward the brake B2 through the lubricating oil supplying hole 313r of the first ring gear 31r, the hydraulic oil flows between the inside and the outside of the first planetary gear mechanism 31 through the space 31o, and thus accumulation of the hydraulic oil can be suppressed (the accumulation amount can be reduced) in the first planetary gear mechanism 31 (the periphery of the first pinion gear 31p, etc.). Furthermore, the first pinion gear 31p and the first ring gear 31r are both configured as helical gears, and mesh with each other such that the lubricating oil is directed toward the flange portion 53b in the axial direction from the meshing portion of the first pinion gear 31p and the first ring gear 31r when the vehicle is travelling forward. Thus, the lubricating oil can be more easily discharged from the inside to the outside of the first planetary gear mechanism 31 through the space 31o. Consequently, an increase in the oil temperature in the first planetary gear mechanism 31 (temperature of the first pinion gear 31p and the first pinion shaft 311p) can be further suppressed, and the wear of the first pinion shaft 311p, and the like can be further suppressed.

Furthermore, in the speed change device 30 of the embodiment, the flange portion 53b of the brake hub 53 of the brake B2 is formed to project toward the radially inner side with respect to the bottom land between the gear teeth 310r of the first ring gear 31r of the first planetary gear mechanism 31. Thus, a part of the hydraulic oil flowing toward the flange portion 53b from the meshing portion of the first pinion gear 31p and the first ring gear 31r can be received by the flange portion 53b. The hydraulic oil then can be supplied to the brake B2 through the flange portion 53b, the inner circumference of the tubular portion 53a, and the lubricating oil flowing hole 53o. As a result, the brake B2 can be more satisfactorily lubricated and cooled.

Moreover, in the speed change device 30 of the embodiment, the press work is performed on the plate body, so that the connecting portion 3117c of the planar portion 3111c and the leg portion 3116c is formed in an arcuate cross-section shape (so-called sheer drop shape). Thus, the connecting portion 3117c can be easily formed.

In the speed change device 30 of the embodiment, the flange portion 53b of the brake hub 53 of the brake B2 projects toward the radially inner side with respect to the bottom land between the gear teeth 310r of the first ring gear 31r of the first planetary gear mechanism 31, but may not project toward the radially inner side with respect to the bottom land.

Figure 8:
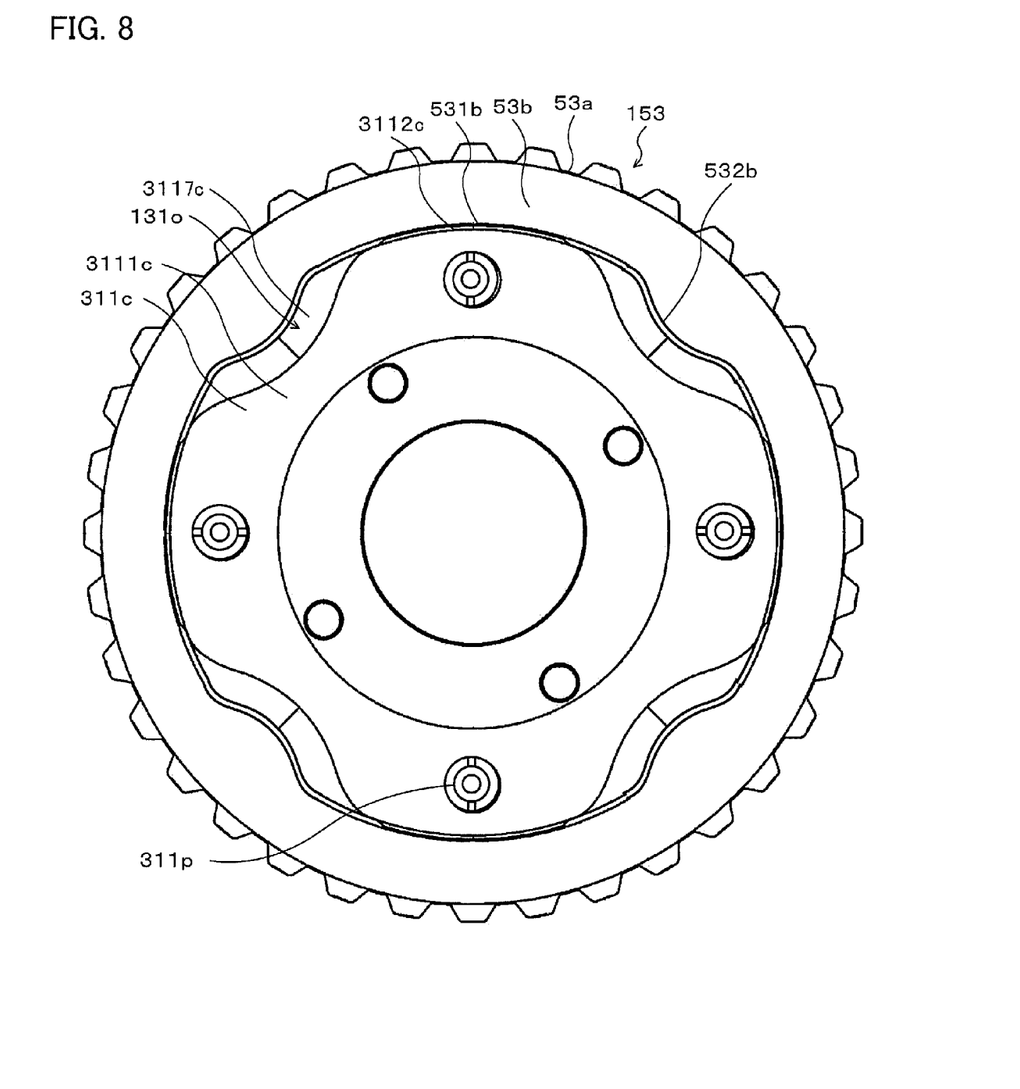
FIG. 8 is a front view of the first carrier, the first pinion shaft, and a brake hub according to a modification.

In the speed change device 30 of the embodiment, the flange portion 53b of the brake hub 53 of the brake B2 is formed to have a constant inner diameter (see FIGS. 5 and 6), but may include a plurality of inner circumferential fixing portions 531b to be fixed with the planar portion 3111c and the outer circumferential fixing portion 3112c of the carrier main body 311c, and a plurality of projections 532b that each projects toward the radially inner side between the two adjacent inner circumferential fixing portions 531b, as shown in the front view of the first carrier 31c, the first pinion shaft 311p, and a brake hub 153 in the modification of FIG. 8. In this case, the hydraulic oil flowing toward the flange portion 53b from the meshing portion of the first pinion gear 31p and the first ring gear 31r can be received more at the flange portion 53b (projection 532b thereof). In this case, a space 131o formed between the outer circumferential surface of the connecting portion 3117c and the flange portion 53b (projection 532b thereof) becomes narrow, and hence the amount of hydraulic oil flowing between the inside and the outside of the first planetary gear mechanism 31 through the space 131o is reduced.

In the speed change device 30 of the embodiment, the connecting portion 3117c between the planar portion 3111c and the leg portion 3116c is formed in an arcuate cross-section shape by performing press work on the plate body, so that a space is formed between the outer circumferential surface of the connecting portion 3117c and the inner circumferential surface of the flange portion 53b of the brake hub 53 of the brake B2, but a space may be formed between the outer circumferential surface of the connecting portion and the inner circumferential surface of the flange portion by performing cutting processes on the outer circumferential portion of the connecting portion.

In the speed change device 30 of the embodiment, the first planetary gear mechanism 31 is configured as a single pinion type planetary gear, but may be configured as a double pinion type planetary gear.

The correspondence will be described between main elements of the embodiment and main elements of the disclosure described in "Summary". In the embodiment, the first sun gear 31s, the first ring gear 31r, and the first carrier 31c including the carrier main body 311c and the carrier cover 312c, the carrier main body having the planar portion 3111c and the leg portions 3116c, correspond to the "planetary gear mechanism". The brake B2 including the brake hub 53 having the tubular portion 53a and the flange portion 53b, and a plurality of friction plates 52 corresponds to the "brake".

In the correspondence between the main elements of the embodiment and the main elements of the disclosure described in "Summary", the embodiment is only an example for specifically describing a mode for carrying out the disclosure described in "Summary". This correspondence does not limit the elements of the disclosure described in "Summary". In other words, the interpretation of the disclosure described in "Summary" is to be made based on the description in the relevant section, and the embodiment is merely a specific example of the disclosure described in "Summary".

The mode for carrying out the disclosure has been described using embodiments, but the present disclosure is not to be limited in any way to such embodiments, and may be implemented in various modes within a scope not deviating from the gist of the disclosure.

INDUSTRIAL APPLICABILITY

The present disclosure can be used in manufacturing industries of a speed change device, and the like.

The invention claimed is:

1. A speed change device that transmits power input to an input shaft to an output shaft while changing a speed ratio to a plurality of speeds, the speed change device comprising:
   a planetary gear mechanism including a sun gear, a ring gear, and a carrier that rotatably supports a plurality of pinion gears, each of the plurality of pinion gears meshing with at least one of the sun gear and the ring gear; and
   a brake including a brake hub fixed to the carrier and a friction plate fitted to an outer circumference of the brake hub, the brake being capable of holding the carrier stationary to a case; wherein
   the ring gear includes a lubricating oil supplying hole through which lubricating oil passes;
   the brake hub includes a tubular portion that surrounds an outer circumference of the ring gear and that includes a lubricating oil flowing hole that causes the lubricating oil from the lubricating oil supplying hole to flow, and a flange portion that extends toward a radially inner side from the tubular portion;
   the carrier includes a carrier main body and a carrier cover, the carrier main body including a planar portion that supports one end of each of a plurality of pinion shafts inserted to each of the plurality of pinion gears, a plurality of leg portions extending in an axial direction at intervals in a circumferential direction from an outer circumference of the planar portion, and a connecting portion that connects the leg portions and the planar portion, and the carrier cover fixed to the leg portions and supporting the other end of each of the plurality of pinion shafts;
   the planar portion includes an outer circumferential fixing portion formed between the two adjacent leg portions in the outer circumference and fixed to an inner circumference of the flange portion;
   a space is formed between an outer circumferential surface of the connecting portion and an inner circumferential surface of the flange portion; and
   the ring gear and the pinion gears are configured as helical gears, and mesh with each other such that the lubricating oil is directed toward the flange portion in the axial direction when a vehicle is travelling forward.

2. The speed change device according to claim 1, wherein the flange portion projects toward the radially inner side with respect to a bottom land between gear teeth of the ring gear.

3. The speed change device according to claim 2, wherein the carrier cover includes a second planar portion that supports the other end of each of the plurality of pinion shafts, and a cylindrical portion extending toward a side opposite to the planar portion in the axial direction from an inner circumferential portion of the second planar portion;
the ring gear is supported by an annular coupling member on the cylindrical portion side of the second planar portion in the axial direction; and
the coupling member is rotatably supported by the cylindrical portion.

4. The speed change device according to claim 3, wherein the connecting portion is formed in an arcuate cross-section shape by press working.

5. The speed change device according to claim 4, wherein the flange portion includes each of a plurality of inner circumferential fixing portions, to which the outer circumferential fixing portion of the planar portion is fixed, and a plurality of projections that each projects toward the radially inner side between the two adjacent inner circumferential fixing portions.

6. The speed change device according to claim 1, wherein the carrier cover includes a second planar portion that supports the other end of each of the plurality of pinion shafts, and a cylindrical portion extending toward a side opposite to the planar portion in the axial direction from an inner circumferential portion of the second planar portion;
the ring gear is supported by an annular coupling member on the cylindrical portion side of the second planar portion in the axial direction; and
the coupling member is rotatably supported by the cylindrical portion.

7. The speed change device according to claim 1, wherein the connecting portion is formed in an arcuate cross-section shape by press working.

8. The speed change device according to claim 1, wherein the flange portion includes each of a plurality of inner circumferential fixing portions, to which the outer circumferential fixing portion of the planar portion is fixed, and a plurality of projections that each projects toward the radially inner side between the two adjacent inner circumferential fixing portions.

* * * * *